(12) United States Patent
Lui

(10) Patent No.: US 6,212,361 B1
(45) Date of Patent: *Apr. 3, 2001

(54) ORDERING MESSAGE SIGNALS FOR TRANSMISSION OVER A TELECOMMUNICATIONS CHANNEL

(75) Inventor: Danny Chick-Leung Lui, Edison, NJ (US)

(73) Assignee: Lucent Technologies, Inc., Murray Hill, NJ (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/053,897

(22) Filed: Apr. 2, 1998

(51) Int. Cl.⁷ .................................................. H04Q 7/00
(52) U.S. Cl. ...................................... 455/31.1; 370/230
(58) Field of Search .................. 455/31.1, 466; 340/825.5, 825.51; 370/412, 413, 415, 416, 417, 229, 230, 411, 428; 379/266, 221, 265

(56) References Cited

U.S. PATENT DOCUMENTS

| | | | |
|---|---|---|---|
| 4,630,261 | * 12/1986 | Irvin | 370/235 |
| 5,280,479 | * 1/1994 | Mary | 370/462 |
| 5,533,094 | * 7/1996 | Sanmugam | 455/426 |
| 5,570,411 | * 10/1996 | Sicher | 455/450 |
| 5,995,491 | * 11/1999 | Richter et al. | 370/263 |
| 6,018,515 | * 1/2000 | Sorber | 370/229 |

* cited by examiner

Primary Examiner—Dwayne Bost
Assistant Examiner—Erika A. Gary
(74) Attorney, Agent, or Firm—DeMont & Breyer, LLC; Jason Paul DeMont; Wayne S. Breyer

(57) ABSTRACT

A server in a telecommunications system is disclosed that prioritizes message signals queued for transmission over a telecommunications channel. A server in accordance with the present invention generalizes a wide range of specific queue disciplines into: (1) a generic sequence, and (2) a set of scalar parameters used in the sequence. Thereafter, the server is capable of mimicking any one of many specific queue disciplines (e.g., FIFO, LIFO, etc.) by appropriately setting the values of the parameters and without changing the generic sequence. An illustrative embodiment of the present invention comprises: receiving a succession of M message signals, $S_I$ through $S_M$, wherein each of the M message signals is a member of one of G classes, $C_I$ through $C_G$; assigning a class ranking $N_i$ to message signals $S_i$ for $S_I$ through $S_M$, wherein message signal $S_i$ is a member of class $C_j$ and $N_i$ is based on the order of arrival of message signal $S_i$ with respect to all of the M message signals that are members of class $C_j$; assigning a priority $P_i$ to message signals $S_i$ for $S_I$ through $S_M$, wherein the priority $P_i$ is based on $N_i$; and transmitting K of the M message signals with the highest priority based on $P_I$ through $P_M$ before the other M–K message signals.

24 Claims, 4 Drawing Sheets

100

300

ORDERING MESSAGE SIGNALS FOR TRANSMISSION OVER A TELECOMMUNICATIONS CHANNEL

FIELD OF THE INVENTION

The present invention relates to telecommunications in general, and, more particularly, to a method and apparatus for ordering a plurality of message signals that are queued pending transmission over a telecommunications channel.

BACKGROUND OF THE INVENTION

FIG. 1 depicts a schematic diagram of a portion of a typical wireless telecommunications system in the prior art, which system provides wireless telecommunications service to a number of wireless terminals (e.g., wireless terminals 101-1 through 101-3) that are situated within a geographic region. The heart of a typical wireless telecommunications system is a wireless switching center ("WSC"), which may also be known as a mobile switching center ("MSC") or mobile telephone switching office ("MTSO"). Typically, a wireless switching center (e.g, WSC 120) is connected to a plurality of base stations (e.g., base stations 103-1 through 103-5) that are dispersed throughout the geographic area serviced by the system and to the local and long-distance telephone and data networks (e.g., local-office 130, local-office 138 and toll-office 140). A wireless switching center is responsible for, among other things, establishing and maintaining a call between a first wireless terminal and a second wireless terminal or, alternatively, between the first wireless terminal and a wireline terminal (e.g., wireline terminal 150), which is connected to the system via the local and/or long-distance networks.

The geographic area serviced by a wireless telecommunications system is partitioned into a number of spatially distinct areas called "cells." As depicted in FIG. 1, each cell is schematically represented by one hexagon and the cells are tessellated in a honeycomb pattern. In practice, however, each cell has an irregular shape that depends on the topography of the terrain surrounding the cell. Typically, each cell contains a base station, which comprises the radios and antennas that the base station uses to communicate with the wireless terminals in that cell and also comprises the transmission equipment that the base station uses to communicate with the wireless switching center.

For example, when a user of wireless terminal 101-1 desires to transmit information to a user of wireless terminal 101-2, wireless terminal 101-1 transmits a data message bearing the user's information to base station 103-1. The data message is then relayed by base station 103-1 to wireless switching center 120 via wireline 102-1. Because wireless terminal 101-2 is in the cell serviced by base station 103-1, wireless switching center 120 returns the data message back to base station 103-1, which relays it to wireless terminal 101-2.

Not only does a base station transmit data messages to the wireless terminals within its cell, but it also transmits control messages as well. In general, the control messages are the means by which a base station coordinates its operation with a wireless terminal. Although a wireless terminal typically receives dozens of control messages every second, it is unlikely that a user of the wireless terminal is aware of that fact, or of the fact that the wireless terminal also acts on and replies to some of those control messages.

FIG. 2 depicts a block diagram of the salient components of base station 103-1 for the generation, accumulation, and transmission of control messages. Base station 103-1 comprises base station controller 201 and forward paging subsystem 202, which accumulates the control messages and transmits them over forward paging channel 203.

Some control messages are generated by wireless switching center 120 and are received by forward paging subsystem 202 via wireline 102-1. Other control messages are generated by base station controller 201 and are received by forward paging subsystem 202 via connection 204. As the control messages are received by forward paging subsystem 202, they are queued pending transmission.

When there is only one control message queued, it is transmitted as soon as possible. In contrast, when there is more than one control message queued, forward paging subsystem 202 must transmit one of the control messages before the others. At first, it may appear that the messages must be transmitted in the same order in which they arrive, but that is not the case. When there are H control messages in a queue, there are H! different orders in which they can be transmitted. Furthermore, each of the H! different orders can have a significantly different effect. Therefore, the process for selecting an order by which forward paging subsystem 202 transmits control messages should carefully consider the ramifications of the selected order.

The same is true for any situation in which there are more people, objects, tasks, messages, etc. in a queue for processing, shipping, completion, transmission, etc. given finite resources for doing so. For example, if 2500 people on a sinking ship are queued to board lifeboats with a total capacity of only 800, then the process for selecting the order by which the people enter the lifeboats has dire ramifications.

For the purposes of this specification, the term "queue discipline" refers to the process for determining how people, objects, tasks, messages, etc. in a queue are ordered for processing, shipping, completion, transmission, etc. given finite resources for doing so. Although some queue disciplines are intentionally established and enforced in society (e.g., at a supermarket check-out, in a hospital emergency room, on a sinking ship, etc.), others follow naturally from cultural norms (e.g., woman and children first, age before beauty, etc.) or logistics (e.g., the last people into a crowded elevator should be the first ones out, etc.). For example:

first-in, first-out ("FIFO")-A first-in, first-out queue discipline processes people, objects, tasks, messages, etc. strictly in the order in which they arrive. A supermarket check-out line is a typical example of a first-in, first-out queue discipline.

triage-A triage queue discipline processes people, objects, tasks, messages, etc. based on the need for or likely benefit from processing. Triage is typically used on a battlefield, at disaster sites, and in hospital emergency rooms when limited medical resources must be allocated. Strictly, there is no single triage queue discipline. Instead, there are a number of triage queue disciplines that are distinguishable based on the specific criteria used to define the need for or likely benefit from processing. Furthermore, the differences between one triage queue discipline and another can be subtle.

last-in, first-out ("LIFO")-A last-in, first-out queue discipline processes people, objects, tasks, messages, etc. strictly in the reverse order in which they arrive. A typical last-in, first-out queue discipline can be observed at crowded elevators where the last people into the elevator are the first ones out.

random-A random queue discipline processes people, objects, tasks, messages, etc. randomly, regardless of the order in which they arrive or any other factor. A typical random queue discipline is a lottery system, because the likelihood of winning is based on a random drawing and not on the order in which the lottery tickets are sold or any other demonstrable factor.

The selection of a queue discipline for forward paging subsystem 202 has a significant effect on the economic viability of the entire telecommunications system. Furthermore, there are six factors that must be considered in choosing a queue discipline for forward paging subsystem 202.

First, the bandwidth of forward paging channel 203 is finite, and, therefore, the mean rate at which control messages can be transmitted, $\mu$, over forward paging channel 203 is also finite. If the mean rate at which control messages arrive, $\lambda$, at forward paging subsystem 202 is greater than the mean rate at which they can be transmitted (i.e., if $\lambda > \mu$), then not all of the control messages can be transmitted. This militates against a first-in, first-out queue discipline and suggests that a triage queue discipline be chosen where control messages of higher priority are transmitted before messages of lower priority.

Second, each control message is perishable (i.e., the usefulness of the information in a control message is dependent on the amount of time that it takes to reach its destination). Furthermore, the operation of the telecommunication system can collapse if some of the highest priority control messages are not transmitted in a timely manner. This suggests that when forward paging subsystem 202 determines the order in which to transmit a plurality of control messages, it should consider the perishability of the control messages, in addition to their relative priority. For example, it is conceivable that a highly-perishable, low-priority control message should be transmitted before a less-perishable, high-priority one.

Third, control messages arrive at forward paging subsystem 202 successively (i.e., one after another in contrast to in bulk), sporadically, and sometimes at a greater rate than they can be transmitted. So although situations may occur in which an arriving control message can be transmitted immediately and without delay, there are also situations in which control messages must wait to be transmitted. The mean wait, T, of a control message pending transmission is:

$$T = \frac{1}{\mu - \lambda} \qquad \text{(Eq. 1)}$$

where $\mu$ is the mean rate at which control messages can be transmitted over forward paging channel 203 and $\lambda$ is the mean rate at which control messages arrive at forward paging subsystem 202. Furthermore, because the arrival of control messages is sporadic, the amount of time that a given control message must wait to be transmitted is unpredictable. This suggests that when forward paging subsystem 202 determines the order in which to transmit a plurality of control messages, it should consider the uncertainty in delay that a control message can experience before it is transmitted in addition to the perishability of the message.

Fourth, there are several classes of control messages. If two or more control messages in the same class are transmitted successively on forward paging channel 203, then an economy of scale can be achieved that effectively increases the mean rate, $\mu$, at which control messages can be transmitted. The economy of scale results from the fact that two or more control messages in the same class that are transmitted successively can share a common header, as is discussed below. Furthermore, an increase in the mean rate, $\mu$, at which control messages can be transmitted causes a corresponding decrease in the mean wait, T, of a control message. Therefore, this suggests that forward paging subsystem 202 should accumulate control messages for a while so that as many of the same class can be transmitted successively.

Fifth, many of the factors affecting T (e.g., $\mu$, $\lambda$, the mix of control messages, etc.) are likely to change over time and vary with location. For example, the factors affecting T are likely to change with the time of day, the day of the week, the seasons, etc. Furthermore, the factors affecting T are likely to be different in Wyoming than in New York. Therefore, forward paging channel 203 must implement a queue discipline that is sophisticated enough to consider and balance the wide range of factors affecting T.

Sixth, statistical data on the factors affecting T may not be known before forward paging subsystem 202 is placed into service, and, therefore, the queue discipline in forward paging channel 203 should be reconfigurable in the field after empirical data for that locale has been gathered.

In summary, the need exists for a forward paging subsystem that: (1) is sophisticated enough to consider and balance the wide range of factors affecting T, (2) attempts to transmit the more perishable control messages before the less perishable, (3) attempts to transmit the higher priority control messages before the lower priority ones, and (4) is quickly and easily reconfigured in the field.

SUMMARY OF THE INVENTION

The present invention is a server (e.g., a radio transmitter in a wireless telecommunications system, a concentrator in a packet-switched network, etc.) that is capable of receiving a succession of message signals (e.g., control messages, data messages, packets, etc.), prioritizing them in accordance with a queue discipline, and transmitting them over a communications channel (e.g., a radio channel, a T-1 line, etc.), without some of the costs and disadvantages of servers in the prior art. In particular, the present invention is easily reconfigured in the field and is sophisticated enough to balance a wide range of factors, including the perishability and priority of each message signal.

A server in accordance with the present invention implements a queue discipline with: (1) a generic sequence, and (2) a set of scalar parameters. This enables the server to be constructed, once and for all, to perform the generic sequence and to be deployed into the field. Thereafter, the server can be configured to mimic any specific queue discipline (e.g., FIFO, LIFO, etc.) by setting the parameters to appropriate values and without having to change the generic sequence.

Furthermore, the generic sequence is sophisticated enough to balance the perishability and priority of individual messages against a wide range of factors, and, the scalar nature of the parameters provides the precision to allow delicate adjustments to the balance.

An illustrative embodiment of the present invention comprises: receiving a succession of M message signals, $S_1$ through $S_M$, wherein each of the M message signals is a member of one of G classes, $C_1$ through $C_G$; assigning a class ranking $N_i$ to message signals $S_i$ for $S_1$ through $S_M$, wherein message signal $S_i$ is a member of class $C_j$ and $N_i$ is based on the order of arrival of message signal $S_i$ with respect to all of the M message signals that are members of class $C_j$; assigning a priority $P_i$ to message signals $S_i$ for $S_1$ through $S_M$, wherein the priority $P_i$ is based on $N_i$; and transmitting K of the M message signals with the highest priority based on $P_1$ through $P_M$ before the other M–K message signals.

DETAILED DESCRIPTION

Figure 1:
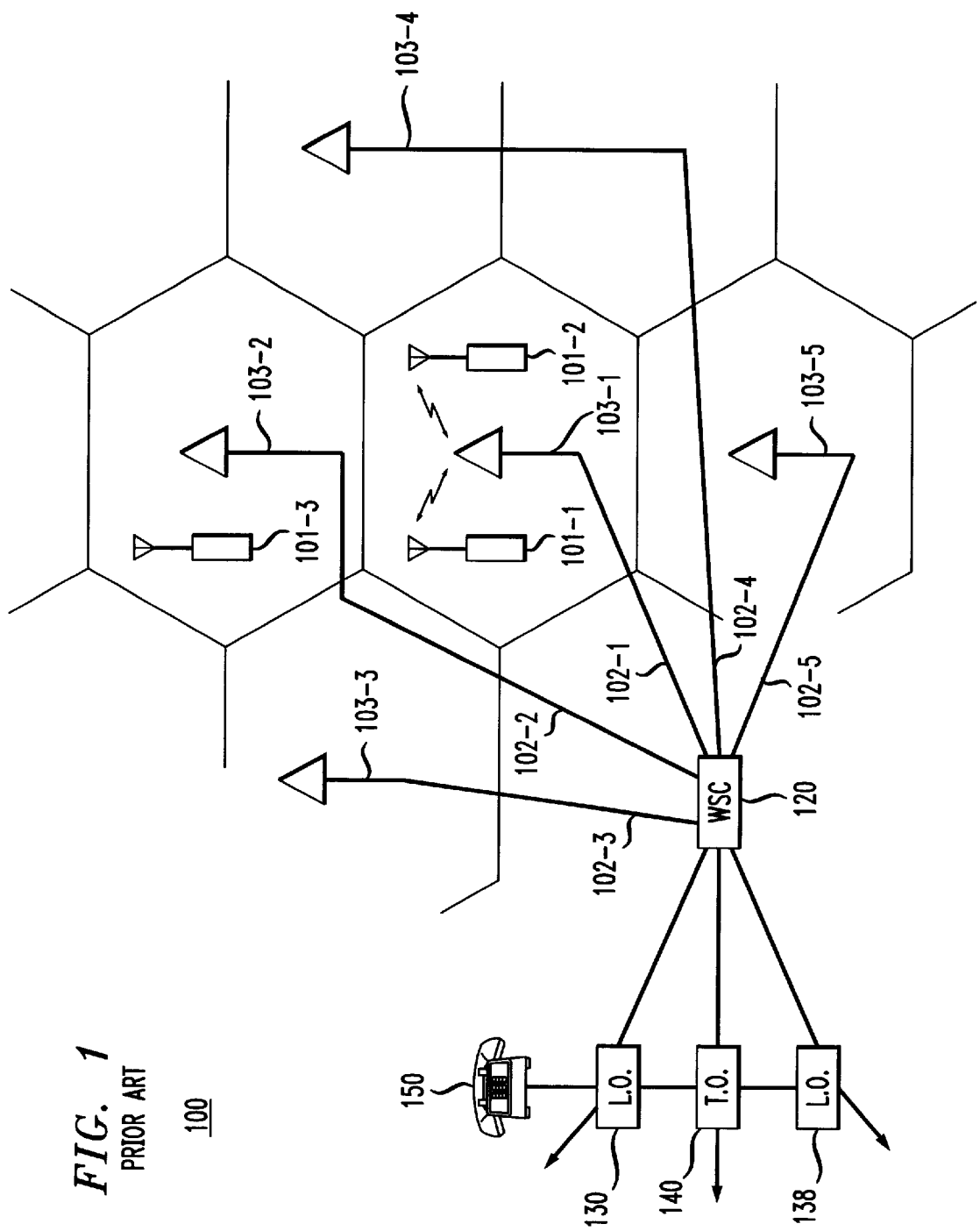
FIG. 1 depicts a schematic drawing of a wireless telecommunications system in the prior art.
Figure 2:
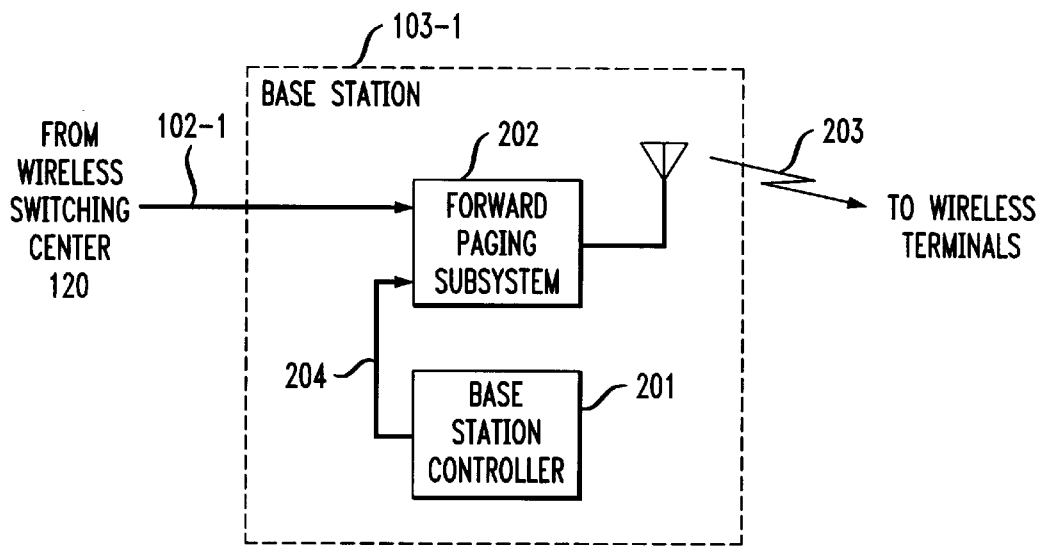
FIG. 2 depicts a block diagram of the salient components of a base station in the prior art for transmitting control messages over a wireless telecommunications channel.
Figure 3:
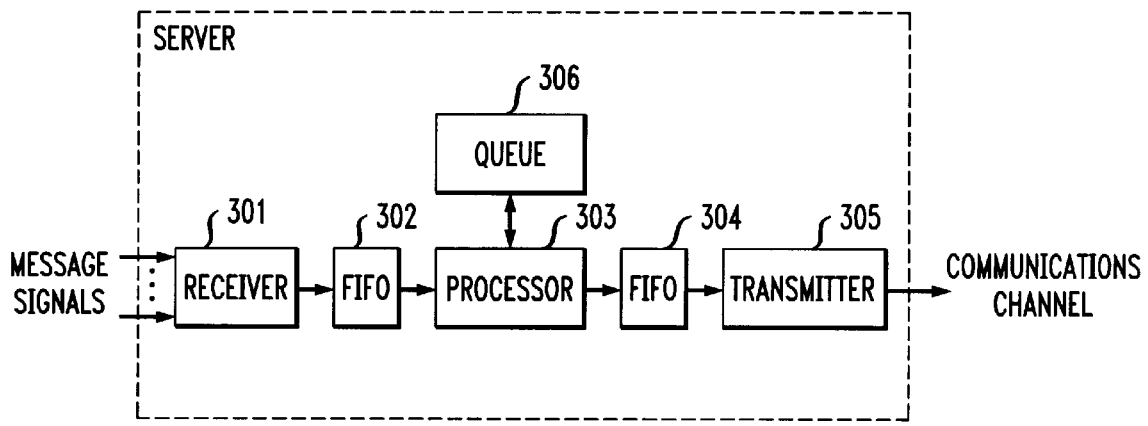
FIG. 3 depicts a block diagram of a server in accordance with the illustrative embodiment of the present invention.

FIG. 3 depicts a block diagram of a server in accordance with the illustrative embodiment of the present invention. Server 300 is an apparatus (e.g., a radio transmitter, a packet concentrator, etc.) that is capable of receiving a succession of message signals (e.g., control messages, data messages, packets, etc.) from different sources, prioritizing them in accordance with a queue discipline, and transmitting them over a communications channel (e.g. a wireless channel, a wireline channel, etc.), in accordance with a queue discipline. Server 300 advantageously comprises: receiver 301, first-in, first-out memory ("FIFO") 302, processor 303, first-in, first-out memory ("FIFO") 304, transmitter 305, and queue 306, interrelated as shown.

Receiver 301 is capable of receiving a succession of message signals from one or more sources, in well-known fashion, at a mean arrival rate of λ message signals/second. As the message signals arrive, receiver 301 forwards them in the order received to FIFO 302. It will be clear to those skilled in the art how to make and use receiver 301.

FIFO 302 accumulates and holds the message signals from receiver 301 until processor 303 is ready to remove them. FIFO 302 outputs the message signals in the order it receives them. It will be clear to those skilled in the art how to make and use FIFO 302.

Figure 4:
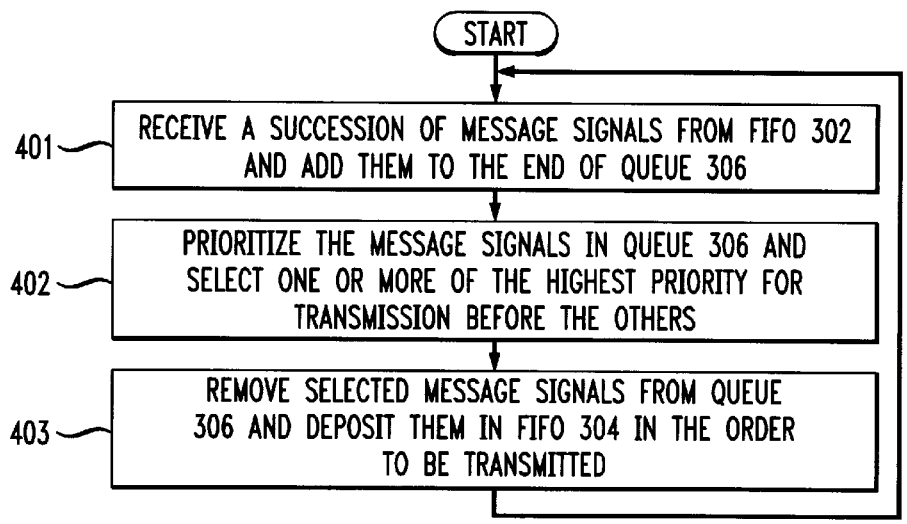
FIG. 4 depicts a flowchart of the illustrative embodiment of the present invention.

Processor 303 is advantageously a general-purpose computer with associated memory and input/output that is capable of iteratively performing the three steps outlined in FIG. 4. At step 401, processor 303 receives a succession of message signals from FIFO 302 and adds them to the end of queue 306. At step 402, processor 303 prioritizes the message signals in queue 306 and selects one or more of the highest priority for transmission before the others based on a queue discipline, which will be described in FIG. 5. At step 403, processor 303 removes the selected message signals from queue 306 and deposits them into FIFO 304 in the order to be transmitted. After step 403, control returns to step 401 and the cycle continues.

FIFO 304 accumulates and holds the message signals from processor 303 until transmitter 305 is ready to remove and transmit them. FIFO 304 outputs the message signals in the order it receives them. It will be clear to those skilled in the art how to make and use FIFO 304.

Transmitter 305 is capable of receiving a succession of message signals from FIFO 304 and of transmitting them, in well-known fashion, at a mean rate of service of μ message signals/second. It will be clear to those skilled in the art how to make and use transmitter 305.

Queue 306 is a read/write memory that holds one or more message signals pending their transmission. Typically, the mean number of message signals, N, in queue 306 is related to the mean arrival rate, λ, and the mean rate, μ, at which control messages can be transmitted by Equations 2 and 3:

$$N = \frac{\rho}{1-\rho} \quad \text{(Eq. 2)}$$

where ρ is determined by Equation 3:

$$\rho = \frac{\lambda}{\mu} \quad \text{(Eq. 3)}$$

It will be clear to those skilled in the art how to determine the capacity of queue 306.

Figure 5:
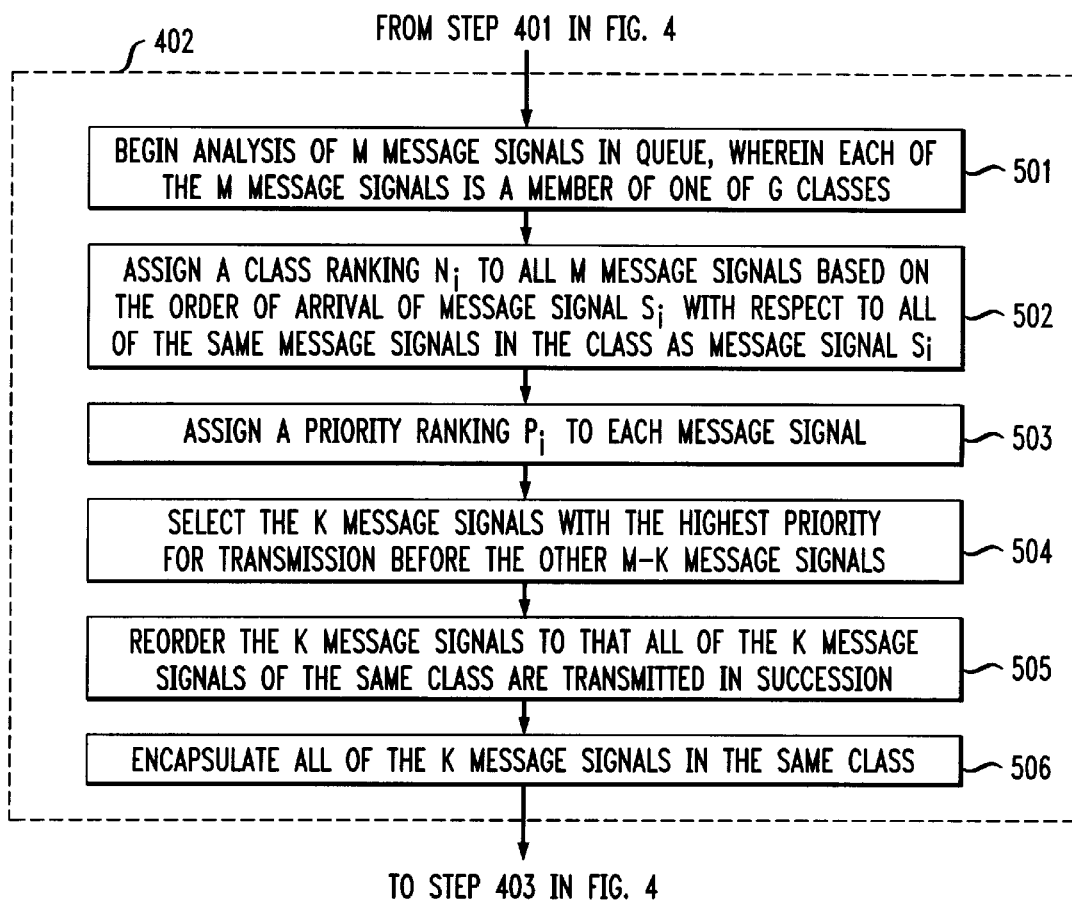
FIG. 5 depicts a flowchart of the detail of one step in FIG. 4.

As mentioned above, processor 303 implements a queue discipline with: (1) a generic sequence, and (2) a set of scalar parameters. FIG. 5 depicts a flowchart of the generic sequence, and the set of scalar parameters are described below with respect to Equation 4.

FIG. 5 depicts a flowchart of the details of step 402 in FIG. 4, which prioritizes the message signals in queue 306 for transmission based on a queue discipline. As each step in FIG. 5 is described in detail, the step will be demonstrated as it operates on an illustrative example.

At step 501, processor 303 begins an analysis of the M message signals, $S_I$ though $S_M$, in queue 306. Each of the M message signals is a member of one of G classes, $C_I$ through $C_G$. Furthermore, each message signal is constructed in such a manner that processor 303 is capable of determining its class by analyzing its structure.

Figure 6:
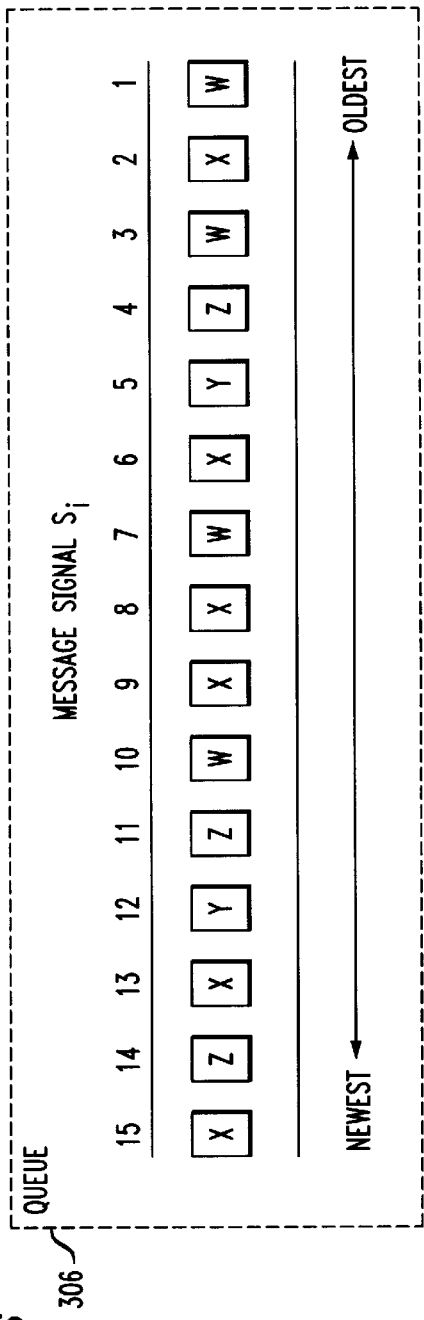
FIG. 6 depicts an illustrative queue in accordance with FIG. 3.

For example, FIG. 6 depicts an illustration in which queue 306 holds 15 message signals, $S_1$ through $S_{15}$, where message signal $S_i$ is received before message signal $S_{i+1}$. Each of the 15 message signals is a member of one of four classes: class W, class X, class Y, or class Z. Furthermore, each message signal in FIG. 6 is depicted by a square that circumscribes a letter indicative of the class to which the message signal is a member. Table 1 summarizes the distribution of the 15 message signals among the four classes.

TABLE 1

| Class | Message Signals |
|---|---|
| W | $S_1, S_3, S_7, S_{10}$ |
| X | $S_2, S_6, S_8, S_9, S_{13}, S_{15}$ |
| Y | $S_5, S_{12}$ |
| Z | $S_4, S_{11}, S_{14}$ |

At step 502, processor 303 assigns a class ranking $N_i$ to message signal $S_i$, for $S_I$ through $S_M$, based on the order of arrival of message signal $S_i$ with respect to all of the message signals in queue 306 that are members of the same class as message signal $S_i$. It should be noted that the messages signals $S_I$ through $S_M$ need not actually be sorted into separate queues based on class-but step 502 may be more easily comprehended if the message signals are visualized as sorted into queues based on class. It will be clear to those skilled in the art that some message signals will be assigned the same class ranking (provided they are in different classes) and, also, that no two message signals in the same class will be assigned the same class ranking.

Conceptually, the class ranking $N_i$ of a message signal $S_i$ equals the cardinal number corresponding to the ordinal position of message signal $S_i$ in a queue consisting of only the message signals in the same class as message signal $S_i$.

Figure 7:
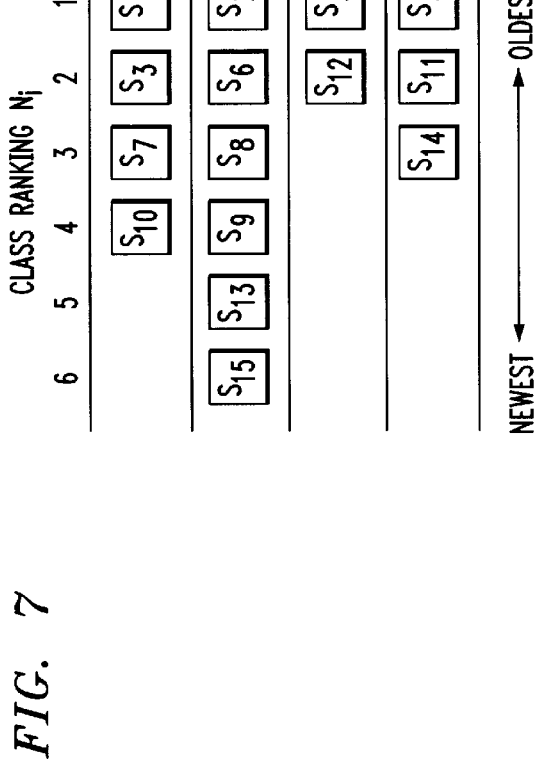
FIG. 7 depicts a diagram that illustrates the relationship of the messages in the queue of FIG. 6 to their class ranking.

FIG. 7 depicts an illustration of the 15 message signals in FIG. 6 as they could be sorted into four queues based on class. In FIG. 7, each message signal is depicted by a square that circumscribes the message signal designation $S_i$. For example, message signal $S_1$ is assigned a class ranking of 1, as are message signals $S_2$, $S_5$, and $S_4$. Table 2 depicts the 15 message signals in Table 1 and their class ranking as assigned by step 502.

TABLE 2

| i | Message Signal - $S_i$ | Class Ranking - $N_i$ |
|---|---|---|
| 1 | $S_1$ | $N_1 = 1$ |
| 2 | $S_2$ | $N_2 = 1$ |
| 3 | $S_3$ | $N_3 = 2$ |
| 4 | $S_4$ | $N_4 = 1$ |
| 5 | $S_5$ | $N_5 = 1$ |
| 6 | $S_6$ | $N_6 = 2$ |
| 7 | $S_7$ | $N_7 = 3$ |
| 8 | $S_8$ | $N_8 = 3$ |
| 9 | $S_9$ | $N_9 = 4$ |
| 10 | $S_{10}$ | $N_{10} = 4$ |
| 11 | $S_{11}$ | $N_{11} = 2$ |
| 12 | $S_{12}$ | $N_{12} = 2$ |
| 13 | $S_{13}$ | $N_{13} = 5$ |
| 14 | $S_{14}$ | $N_{14} = 3$ |
| 15 | $S_{15}$ | $N_{15} = 6$ |

Referring again to FIG. 5, at step 503, processor 303 assigns a priority ranking $P_i$ to each message signal $S_i$, for $S_1$ through $S_M$, based on:

$$P_i = \alpha_c N_i + \beta_c + \gamma_c i \quad \text{(Eq. 4)}$$

where $\alpha_c$ is a first parameter for class $C_j$, $\beta_c$ is a second parameter for class $C_j$, $\gamma_c$ is a third parameter for class $C_j$, i is the cardinal number corresponding to the ordinal position of message signal $S_i$ in queue 306, and message signal $S_i$ is a member of class $C_j$.

The first parameter $\alpha_c$ can be used, for example, to prioritize the messages signals in one class as more perishable that the message signals in another class. The second parameter $\beta_c$ can be used, for example, to prioritize the messages signals in one class as having a higher priority than the message signals in another class, and the third parameter $\gamma_c$ can, for example, be used for one or both of two purposes. The first purpose for which the third parameter can be used is to preclude ties in priority rankings and the second is to affect whether the message signals in a class should be transmitted in FIFO or LIFO order.

The three parameters $\alpha_c$, $\beta_c$, and $\gamma_c$ enable a wide-range of disparate queue disciplines to be mimicked and refined and adjusted without changing the generic steps in FIG. 4. Typically, the message signals with the lowest priority ranking are considered to have the highest priority. Furthermore, negative priority rankings are considered to be higher in priority than positive priority rankings.

When two or more message signals are assigned the same priority ranking, then those message signals are output in the same order they are in queue 306. The third parameter $\gamma_c$ can be used to ensure that no two messages have the same priority ranking, and to process a class of message signals in either first-in, first-out order or last-in, first-out order. For example, one set of values for $\alpha_c$, $\beta_c$, and $\gamma_c$ may cause the illustrative embodiment to mimic a first-in, first-out queue discipline ($\alpha_c=0$, $\beta_c=0$, and $\gamma_c=+1$), while another causes the mimicry of a last-in, first-out queue discipline ($\alpha_c=0$, $\beta_c=0$, and $\gamma_c=-1$).

Tables 3, 4 and 5 depicts a set of values for $\alpha_c$ and $\beta_c$, respectively, that implement a round-robin queue in which one message signal is transmitted from each class before a second message signal is transmitted from any class.

TABLE 3

The First Parameter

| Class | $\alpha_c$ |
|---|---|
| W | 50 |
| X | 50 |
| Y | 50 |
| Z | 50 |

TABLE 4

The Second Parameter

| Class | $\beta_c$ |
|---|---|
| W | 101 |
| X | 102 |
| Y | 103 |
| Z | 104 |

TABLE 5

The Third Parameter

| Class | $\gamma_c$ |
|---|---|
| W | 0 |
| X | 0 |
| Y | 0 |
| Z | 0 |

Table 6 depicts the priority ranking $P_i$ to each message signal $S_i$, for $S_1$ through $S_M$, based on Equation 4 and the parameters in Tables 3, 4, and 5.

TABLE 6

| i | Message Signal - $S_i$ | Class Ranking - $P_i$ |
|---|---|---|
| 1 | $S_1$ | $P_1 = 151$ |
| 2 | $S_2$ | $P_2 = 152$ |
| 3 | $S_3$ | $P_3 = 201$ |
| 4 | $S_4$ | $P_4 = 154$ |
| 5 | $S_5$ | $P_5 = 153$ |
| 6 | $S_6$ | $P_6 = 202$ |
| 7 | $S_7$ | $P_7 = 251$ |
| 8 | $S_8$ | $P_8 = 252$ |
| 9 | $S_9$ | $P_9 = 302$ |
| 10 | $S_{10}$ | $P_{10} = 301$ |
| 11 | $S_{11}$ | $P_{11} = 204$ |
| 12 | $S_{12}$ | $P_{12} = 203$ |
| 13 | $S_{13}$ | $P_{13} = 352$ |
| 14 | $S_{14}$ | $P_{14} = 254$ |
| 15 | $S_{15}$ | $P_{15} = 402$ |

It will be clear to those skilled in the art how to determine values for $\alpha_c$, $\beta_c$, and $\gamma_c$ to mimic any queue discipline of interest.

At step 504, processor 303 selects a set of K message signals for transmission before the other M–K message signals based on $P_1$ through $P_M$. Advantageously, the K message signals are the K highest priority messages signals based on based on $P_1$ through $P_M$. This enables processor 303 to select one, some or all of the messages in queue 306 before processor 303 considers message signals that have yet to be retrieved from FIFO 302. It will be clear to those skilled in the art how to determine appropriate values for K. For example, if only one message signal is to be transmitted per iteration, them K=1. Alternatively, if all of the message signals in queue 306 are to be transmitted each iteration, then K=M. K is, however, advantageously a function of the mean rate, $\mu$, at which control messages are transmitted and the rate at which processor 303 cycles through the steps in FIG. 4.

In the illustrative example, K is assumed to be equal to 7. For K=7, message signals $S_1$, $S_2$, $S_3$, $S_4$, $S_5$, $S_6$, and $S_{12}$ from Table 6 would be selected because they are the 7 message signals with the highest priority (i.e., lowest $P_i$).

At step 505, the K message signals are rearranged so that all of the message signals in the same class are transmitted in succession. In the illustrative example, FIG. 6 and 7 and Table 1 indicate that $S_1$ and $S_3$ are in the same class, $S_2$ and $S_6$ are in the same class, and $S_5$ and $S_{12}$ are in the same class.

At step 506, all of the message signals in the same class are encapsulated. For the purposes of this specification, the term "encapsulated" and its inflected forms means the joining of two or more message signals of the same class into a common data structure. In the illustrative example, $S_1$ and $S_3$ are encapsulated, $S_2$ and $S_6$ are encapsulated, and $S_5$ and $S_{12}$ are encapsulated. Message signal $S_4$ is not encapsulated.

From step 506, control passes to step 403 in FIG. 4 where processor 303 removes the K selected message signals from queue 306 and deposits them into FIFO 304 in the order to be transmitted.

It is to be understood that the above-described embodiments are merely illustrative of the invention and that many variations may be devised by those skilled in the art without departing from the scope of the invention. It is therefore intended that such variations be included within the scope of the following claims and their equivalents.

What is claimed is:

1. A method comprising:
   receiving a succession of M message signals, $S_I$ through $S_M$, wherein each of said M message signals is a member of one of G classes, $C_I$ through $C_G$;
   assigning a class ranking $N_i$ to said message signal $S_i$ for $S_I$ through $S_M$, wherein message signal $S_i$ is a member of class $C_j$ and $N_i$ is based on the order of arrival of said message signal $S_i$ with respect to all of said M message signals that are members of class $C_j$;
   assigning a priority $P_i$ to said message signal $S_i$ for $S_I$ through $S_M$, wherein said priority $P_i$ is based on $N_i$; and
   transmitting a set of K message signals based on $P_I$ through $P_M$;
   wherein said priority $P_i$ is based on $\alpha_c N_i$, and $\alpha_c$ is a first parameter for class $C_j$ that indicates the relative perishability of the message signals in class $C_j$ with respect to the message signals in other classes.

2. The method of claim 1 wherein said priority $P_i$ equals $\alpha_c N_i$, and $\beta_c$ is a second parameter for class $C_j$ that indicates the relative priority of the message signals in class $C_j$ with respect to the message signals in other classes.

3. The method of claim 1 wherein said priority $P_i$ equals $\alpha_c N_i + \beta_c + \gamma_c i$, $\beta_c$ is a second parameter for class $C_j$ that indicates the relative priority of the message signals in class $C_j$ with respect to the message signals in other classes, and $\gamma_c$ is a third parameter for class $C_j$ that indicates whether the message signals in class $C_j$ are to be transmitted in FIFO or LIFO order.

4. The method of claim 1 wherein said set of K message signals are transmitted over a forward paging channel in a wireless telecommunications system.

5. The method of claim 1 further comprising the step of reordering said set of K message signals so that all of said message signals of the same class are transmitted in succession.

6. The method of claim 5 further comprising the step of encapsulating said message signals in said set of K message signals that are members of the same class.

7. The method of claim 5 wherein said M message signals are stored in a queue and further comprising the step of deleting said set of K message signals from said queue.

8. The method of claim 1 wherein said set of K message signals are the K highest priority messages signals based on $P_I$ through $P_M$.

9. An apparatus comprising:
   a receiver for receiving a succession of M message signals, $S_I$ through $S_M$, wherein each of said M message signals is a member of one of G classes, $C_I$ through $C_G$;
   a processor for assigning a class ranking $N_i$ to said message signal $S_i$ for $S_I$ through $S_M$, wherein message signal $S_i$ is a member of class $C_j$ and $N_i$ is based on the order of arrival of said message signal $S_i$ with respect to all of said M message signals that are members of class $C_j$, and for assigning a priority $P_i$ to said message signal $S_i$ for $S_I$ through $S_M$, wherein said priority $P_i$ is based on $N_i$; and
   a transmitter for transmitting a set of K message signals based on $P_I$ through $P_M$;
   wherein said priority $P_i$ is based on $\alpha_c N_i$, and $\alpha_c$ is a first parameter for class $C_j$ that indicates the relative perishability of the message signals in class $C_j$ with respect to the message signals in other classes.

10. The apparatus of claim 9 wherein said priority $P_i$ equals $\alpha_c N_i + \beta_c$, and $\beta_c$ is a second parameter for class $C_j$ that indicates the relative priority of the message signals in class $C_j$ with respect to the message signals in other classes.

11. The apparatus of claim 9 wherein said priority $P_i$ equals $\alpha_c N_i + \beta_c + \gamma_c i$, $\beta_c$ is a second parameter for class $C_j$ that indicates the relative priority of the message signals in class $C_j$ with respect to the message signals in other classes, and $\gamma_c$ is a third parameter for class $C_j$ that indicates whether the message signals in class $C_j$ are to be transmitted in Fix or LIFO order.

12. The apparatus of claim 9 wherein said set of K message signals are transmitted over a forward paging channel in a wireless telecommunications system.

13. The apparatus of claim 9 wherein said processor is also for reordering said set of K message signals so that all of said message signals of the same class are transmitted in succession.

14. The apparatus of claim 13 wherein said processor is also for encapsulating said message signals in said set of K message signals that are members of the same class.

15. The apparatus of claim 13 wherein said M message signals are stored in a queue and wherein said processor is also for deleting said set of K message signals from said queue.

16. The apparatus of claim 9 wherein said set of K message signals are the K highest priority messages signals based on $P_I$ through $P_M$.

17. A method comprising:
    receiving a succession of M message signals, $S_I$ through $S_M$, wherein each of said M message signals is a member of one of G classes, $C_I$ through $C_G$;
    assigning a class ranking $N_i$ to said message signal $S_i$ for $S_I$ through $S_M$, wherein message signal $S_i$ is a member of class $C_j$ and $N_i$ is based on the order of arrival of said message signal $S_i$ with respect to all of said M message signals that are members of class $C_j$;
    assigning a priority $P_i$ to said message signal $S_i$ for $S_I$ through $S_M$, wherein said priority $P_i$ is based on $N_i$; and transmitting a set of K message signals based on $P_1$ through $P_M$;

wherein said priority $P_i$ is based on $N_i+\beta_c$, and $\beta_c$ is a first parameter for class $C_j$ that indicates the relative priority of the message signals in class $C_j$ with respect to the message signals in other classes.

18. The method of claim 17 further comprising the step of reordering said set of K message signals so that all of said message signals of the same class are transmitted in succession.

19. A method comprising:

receiving a succession of M message signals, $S_1$ through $S_M$, wherein each of said M message signals is a member of one of G classes, $C_1$ through $C_G$;

assigning a class ranking $N_i$ to said message signal $S_i$ for $S_1$ through $S_M$, wherein message signal $S_i$ is a member of class $C_j$ and $N_i$ is based on the order of arrival of said message signal $S_i$ with respect to all of said M message signals that are members of class $C_j$;

assigning a priority $P_i$ to said message signal $S_i$ for $S_1$ through $S_M$, wherein said priority $P_i$ is based on $N_i$; and transmitting a set of K message signals based on $P_1$ through $P_M$;

wherein said priority $P_i$ is based on $N_i+\gamma_c i$ and $\gamma_c$ is a first parameter for class $C_j$ that indicates whether the message signals in class $C_j$ are to be transmitted in FIFO or LIFO order.

20. The method of claim 19 further comprising the step of reordering said set of K message signals so that all of said message signals of the same class are transmitted in succession.

21. An apparatus comprising:

a receiver for receiving a succession of M message signals, $S_1$ through $S_M$, wherein each of said M message signals is a member of one of G classes, $C_1$ through $C_G$;

a processor for assigning a class ranking $N_i$ to said message signal $S_i$ for $S_1$ through $S_M$, wherein message signal $S_i$ is a member of class $C_j$ and $N_i$ is based on the order of arrival of said message signal $S_i$ with respect to all of said M message signals that are members of class $C_j$, and for assigning a priority $P_i$ to said message signal $S_i$ for $S_1$ through $S_M$, wherein said priority $P_i$ is based on $N_i$; and a transmitter for transmitting a set of K message signals based on $P_1$ through $P_M$;

wherein said priority $P_i$ is based on $N_i+\beta_c$, and $\beta_c$ is a first parameter for class $C_j$ that indicates the relative priority of the message signals in class $C_j$ with respect to the message signals in other classes.

22. The apparatus of claim 21 wherein said processor is also for reordering said set of K message signals so that all of said message signals of the same class are transmitted in succession.

23. An apparatus comprising:

a receiver for receiving a succession of M message signals, $S_1$ through $S_M$, wherein each of said M message signals is a member of one of G classes, $C_1$ through $C_G$;

a processor for assigning a class ranking $N_i$ to said message signal $S_i$ for $S_1$ through $S_M$, wherein message signal $S_i$ is a member of class $C_j$ and $N_i$ is based on the order of arrival of said message signal $S_i$ with respect to all of said M message signals that are members of class $C_j$, and for assigning a priority $P_i$ to said message signal $S_i$ for $S_1$ through $S_M$, wherein said priority $P_i$ is based on $N_i$; and a transmitter for transmitting a set of K message signals based on $P_1$ through $P_M$;

wherein said priority $P_i$ is based on $N_i+\gamma_c i$ and $\gamma_c$ is a first parameter for class $C_j$ that indicates whether the message signals in class $C_j$ are to be transmitted in FIFO or LIFO order.

24. The apparatus of claim 21 wherein said processor is also for reordering said set of K message signals so that all of said message signals of the same class are transmitted in succession.

* * * * *